(12) United States Patent
Glausch

(10) Patent No.: US 6,488,757 B2
(45) Date of Patent: Dec. 3, 2002

(54) AFTER COATING OF PEARL LUSTER PIGMENTS WITH HYDROPHOBIC COUPLING REAGENTS

(75) Inventor: Ralf Glausch, Muehltal (DE)

(73) Assignee: Merck Patent Gesellschaft mit beschraenker Haftung (DE)

( * ) Notice: Subject to any disclaimer, the term of this patent is extended or adjusted under 35 U.S.C. 154(b) by 0 days.

(21) Appl. No.: 09/985,942

(22) Filed: Nov. 6, 2001

(65) Prior Publication Data

US 2002/0096087 A1 Jul. 25, 2002

(30) Foreign Application Priority Data

Nov. 6, 2000 (DE) .......................................... 100 54 981

(51) Int. Cl.$^7$ .............................................. C04B 14/20
(52) U.S. Cl. ........................ 106/415; 106/404; 106/417; 106/418; 106/429; 106/430; 106/431; 106/436; 106/438; 106/439; 106/450; 106/453; 106/456
(58) Field of Search ................................. 106/404, 415, 106/417, 418, 429, 430, 431, 436, 438, 439, 450, 453, 456

(56) References Cited

U.S. PATENT DOCUMENTS

| | | | |
|---|---|---|---|
| 4,482,389 A | | 11/1984 | Franz et al. |
| 5,035,748 A | * | 7/1991 | Burow et al. ................ 106/416 |
| 5,458,976 A | | 10/1995 | Horino et al. |
| 5,472,491 A | * | 12/1995 | Duschek et al. ............. 106/415 |
| 5,629,400 A | * | 5/1997 | Standke et al. .............. 524/385 |
| 5,679,147 A | * | 10/1997 | Standke et al. ......... 106/287.11 |
| 5,759,255 A | * | 6/1998 | Venturini et al. ............ 106/417 |
| 6,176,918 B1 | | 9/2001 | Glausch et al. |

FOREIGN PATENT DOCUMENTS

| | | |
|---|---|---|
| EP | 0104516 A | 4/1984 |
| EP | 0 268 918 | 1/1988 |
| EP | 0 632 109 B1 | 4/1995 |
| EP | 0 632 109 A1 | 4/1995 |
| JP | 8-208418 | 8/1996 |
| WO | WO 98/13426 A1 | 9/1983 |
| WO | WO 98/13426 | 4/1998 |

OTHER PUBLICATIONS

European Search Report for EP 1203795 A1.
European Search Report for EP 1203794 A1.

* cited by examiner

Primary Examiner—Mark L. Bell
Assistant Examiner—Shalie Manlove
(74) Attorney, Agent, or Firm—Millen, White, Zelano & Braingan, P.C.

(57) ABSTRACT

The present invention relates to a pearl luster pigment on the basis of a platelet-shaped substrate coated with metal oxides and a top layer which is located on the metal oxide layer and can possess a multilayer structure, comprising a first layer, containing a hydroxide or oxide hydrate of the elements aluminum or silicon, a second layer, containing at least one hydroxide or oxide hydrate of the elements aluminum, silicon, cerium or zirconium, with the exception of the hydroxide or oxide hydrate which forms the first layer, and a third layer, containing at least one organic hydrophobic coupling agent. The present invention also relates to a preparation process and the use of pigments in paints, inks, plastics, coatings and cosmetics.

12 Claims, No Drawings

AFTER COATING OF PEARL LUSTER PIGMENTS WITH HYDROPHOBIC COUPLING REAGENTS

The invention relates to hydrophobically aftercoated pearl luster pigments and to a process for preparing them. The invention further relates to the use of these pigments.

EP 0 632 109 discloses for example the subjecting of pearl luster pigments for coating compositions to an aftertreatment in order to improve their stability. In the course of this aftertreatment the pigments are coated with a layer comprising silicon dioxide, aluminum oxide, chromium oxide and/or zirconium oxide and a layer comprising an organofunctional coupling reagent, e.g. hydrophilic silanes or zirconium aluminates.

The organofunctional silanes used in EP 0 632 109 possess the following basic structure:

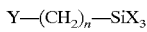

$$Y-(CH_2)_n-SiX_3$$

in which n is 1–8, Y is an organofunctional group, for example an alkyl or substituted alkyl, an aryl or substituted aryl, a halogen, an amino, a methacrylic, a vinyl and/or an epoxy group, preferably fluorine and X is a silicon-functional group which following its hydrolysis reacts with active sites of an inorganic substrate or, by condensation, with other silicon compounds. In this case X may be, for example, an alkoxy group, a hydroxy, or a halogen.

The hydrophilic groups Y react with the polymers of a coating composition to form bonds, while the silicon-functional group X reacts with the pigment surface.

Further hydrophilic silane coupling reagents containing reactive Y groups for the aftercoating of mica pigments are known from U.S. Pat. No. 5,759,255.

WO98/13426 discloses coatings comprising water-based complex oligomeric silane systems.

When the above-mentioned hydrophilic organofunctional coupling reagents are used in aqueous systems, these reagents build up a water layer on the pigment surface. This results in blistering and swelling of the coating composition, thereby reducing the adhesion of the coating composition to the substrate.

A further disadvantage of aftercoating by means of hydrophilic reactive silanes is the promotion of osmosis which may adversely affect the coating composition.

SUMMARY OF THE INVENTION

It is a feature of the invention to overcome these disadvantages and to provide pigments which are advantageous relative to the prior art, being improved in particular in their stability in coatings and in the simultaneous improvement of further performance properties, such as reduced blistering, wetting and adhesion, and in the swelling behavior.

This feature can be achieved in accordance with the invention by the provision of a pearl luster pigment, treated with hydrophobic coupling reagents, in which no chemical bond is formed between the polymer and the organofunctional moiety. While not wishing to be bound by theory, it is believed that this result is obtained because the coupling agents, such as alkyl and aryl silanes, generally have no reactive groups. As a result, the coupling agents do not react with the polymer (binder) of the lacquer. As an example, the hydrolysed silane reacts with the hydroxyl groups of the metal oxides. The result can be the removal of water and the formation of an oxygen bridge between the metal oxide and coupling agent.

Specifically, aftercoated pearl luster pigments are provided on the basis of a platelet-shaped substrate coated with metal oxides and a top layer which is located on the metal oxide layer and possesses a multilayer structure, comprising a first layer, containing a hydroxide or oxide hydrate of the elements aluminum or silicon, a second layer, containing at least one hydroxide or oxide hydrate of the elements aluminum, silicon, cerium or zirconium, with the exception of the hydroxide or oxide hydrate which forms the first layer, and a third layer, containing at least one organic hydrophobic coupling reagent.

The first and second layer together are 1–3% by weight with respect to the base pigment, i.e., a platelet-shaped substrate coated with at least one metal oxide. In addition, the first and second layer may, in combination, have a thickness of 10–50 nm. Preferably, the first layer is aluminum oxide hydrate and the second layer is silicon oxide hydrate.

The pearl luster pigments prior to aftercoating (substrates) are pigments which comprise a platelet-shaped material, for example mica, kaolin or glass, and one or more metal oxide layers deposited thereon. The metal oxide layer may comprise, for example, titanium dioxide, titanium dioxide mixed with iron (III) oxide, iron (III) oxide, chromium oxide, zirconium dioxide, tin dioxide or zinc oxide. Pigments of this kind are available commercially under the designation Iriodin® (manufacturer: E. Merck, Darmstadt, Germany).

The coupling reagent is preferably selected from the group of the silanes, these compounds carrying at least one functional group selected from straight-chain or branched alkyl groups having 3 to 18 carbon atoms, unsubstituted or substituted by fluorine, and aryl groups unsubstituted or substituted by $C_1$–$C_{10}$ alkyl groups and/or nitro groups.

Among the above-mentioned coupling reagents, particular preference is given to the aryl-, alkyl- and fluoroalkyl-substituted di- and trimethoxysilanes. These include, for example, ethoxyphenyltrimethoxysilane, propyltrimethoxysilane, butyltrimethoxysilane, isobutyltrimethoxysilane, hexyltrimethoxysilane, octyltrimethoxysilane, 1H, 1H, 2H, 2H-perfluorodecyltrimethoxysilane and (3,3,3-trifluoropropyl)methyldimethoxysilane.

The coupling agent may be 0.2–1.2% by weight relative to the base payment, the platelet-shaped substrate coated with at least one metal oxide.

A further object can be to provide a process for obtaining the pearl luster pigments of the invention.

This feature can be achieved by the provision of a multistage process in which the substrate coated with metal oxides is suspended in water, heated at from 30 to 100° C., preferably from 40 to 75° C., the suspension is adjusted to a pH of from 3 to 9, preferably from 6 to 7, in a first stage one or more water-soluble metal salts are added, these salts are deposited in whole or in part as metal hydroxides and/or metal oxide hydrates, in a second stage by adding at least one water-soluble silicate, aluminum salt, cerium salt and/or zirconium salt at a pH in the range from 3 to 9, preferably from 6 to 7, the corresponding hydroxides or oxide hydrates thereof are deposited, and in a third stage at least one organic hydrophobic coupling agent is added and binds to the deposited oxide hydrate layer at a pH of from 3 to 9, preferably from 6 to 8. Subsequently, the pigment obtained in this way may be separated by sedimentation, washing and filtration and dried at from 80 to 160° C., preferably from 120 to 160° C.

If required, a sedimentation of the pigment may be carried out as a purifying step between the second and third stages.

The metal hydroxides and/or metal oxide hydrates employed in the process of the invention are hydroxides and/or oxide hydrates of aluminum, silicon, zirconium and cerium, preferably of aluminum and silicon.

Coupling agents used are preferably those mentioned above.

The pearl luster pigments coated in accordance with the invention are used in particular in the pigmenting of inks, such as printing inks, and plastics, such as polymer films, and coating compositions, such as paints, for example. They are also employed, however, in other areas where the above-mentioned improved properties play a part, such as the pigmenting of cosmetics, for example.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever.

In the foregoing and in the following examples, all temperatures are set forth uncorrected in degrees Celsius; and, unless otherwise indicated, all parts and percentages are by weight.

The entire disclosure of all cited applications, patents and publications, and corresponding DE application No. 10054981.0, filed Nov. 6, 2000 is hereby incorporated by reference.

EXAMPLES

Different pearl luster pigments were coated in an aftertreatment process using hydrophobic silanes in accordance with Table 1.

TABLE 1

Aftertreatment of pearl luster pigments

| Example No. | Base pigment | Inorganic component of the aftertreatment | Organofunctional component |
|---|---|---|---|
| 1 | Iriodin ® 504 | 1.2% AlO (OH) 1.5% SiO$_2$ | 4.5% P01080 alkylsilane |
| 2 | Iriodin ® 225 | 1.2% AlO (OH) 1.5% SiO$_2$ | 4.5% P01080 alkylsilane |
| 3 | Iriodin ® 504 | 1.2% AlO (OH) 1.5% SiO$_2$ | 3.0% F 8261 fluorosilane |
| 4 | Iriodin ® 225 | 1.2% AlO (OH) 1.5% SiO$_2$ | 3.0% F 8261 fluorosilane |
| 5 | Iriodin ® 504 | 1.2% AlO(OH) 1.5% SiO$_2$ | 3.0% P01080 alkylsilane |
| 6 | Iriodin ® 225 | 1.2% AlO (OH) 1.5% SiO$_2$ | 3.0% P01080 alkylsilane |
| 7 | Iriodin ® 225 | 1.5% SiO$_2$ 1.2% AlO (OH) 0.5% CeO$_2$ | 3.0% F 8261 fluorosilane |
| 8 | Iriodin ® 504 | 1.4% SiO$_2$ 1.3% ZrO$_2$ 0.5% CeO$_2$ | 2.5% P01080 alkylsilane |

F 8261: DYNASYLAN F8261, CAS [51851-37-7], $C_{14}H_{19}F_{13}O_3Si$, (ABCR GmbH & Co. KG, Karlsruhe, Germany)
P01080: trimethoxybutylsilane, (ABCR GmbH & Co. KG, Karlsruhe, Germany)
Iriodin® 504: red pearl luster pigment based on mica covered with iron oxide
Iriodin® 225: blue pearl luster pigment based on mica covered with rutile
Condensation Testing The pigment specimens 1 to 6 (Table 1) were incorporated into an aqueous coating system based on an acrylic binder and the test specimens were produced by spray application.

The specimens were weathered by means of a condensation test in accordance with DIN 50017 and were evaluated one hour after the end of exposure.

The blistering was evaluated visually in accordance with DIN 53209. "m" here is a measure of the number of blisters per unit area, while "g" is a measure of the size of the blisters. The evaluation scale ranges from 0 (very good) to 5 (very poor).

The swelling is likewise assessed visually in accordance with DIN 53230. The relative evaluation scale ranges from 0 (unchanged) to 5 (very severely changed).

The adhesion was determined visually in accordance with DIN 53151, the relative evaluation scale ranging from 0 (very good) to 5 (very poor).

Table 2 contains the test results of the specimens 1 to 6 and also the comparative specimens with Iriodin® 225 WR II and Iriodin® 504 WR II, and a pigment-free blank specimen as aqueous clearcoat. Iriodin® 225 WR II and Iriodin® 504 WR II differ from the Iriodins used in specimens 1 to 6 in that "WR II" Iriodins have a known $ZrO_2$ aftercoating.

TABLE 2

Test results of the aftertreated pigments in the condensation test

| Example No. | Blistering | Swelling | Adhesion |
|---|---|---|---|
| 1 | m1/g1 | Q1 | 0–1 |
| 2 | m0/g0 | Q0 | 0 |
| 3 | m1/g1 | Q0–1 | 1 |
| 4 | m0/g0 | Q0–1 | 0 |
| 5 | m1/g1 | Q0–1 | 0 |
| 6 | m0/g0 | Q0 | 0 |
| 7 | m0/g0 | Q0–1 | 0–1 |
| 8 | m1/g1 | Q1 | 0–1 |
| Iriodin ® 225 WR II | m2/g1 | Q1–2 | 1–2 |
| Iriodin ® 504 WR II | m3/g4 | Q3–4 | 4 |
| Blank specimen | m0/g0 | Q0 | 0 |

Preparation Example (Examples 1–6) for the Following Layer Structure

Layer 1: $SiO_2$; Layer 2: AlO(OH); Layer 3: Hydrophobic Silane 25 g of the pigment are suspended in 300 ml of deionized water. The suspension is then heated to 75° C. and the pH is adjusted to 6.5–7.0 using dilute sulfuric acid or dilute sodium hydroxide solution. Here, and below, the pH is monitored by means of an indicator. Subsequently, a solution of 1.12 g of $AlCl_3 \cdot 6H_2O$ in 10 ml of deionized water is added to the suspension over a period of two hours, using 2.5% strength sodium hydroxide solution in order to maintain the pH at between 6.5 and 7.0. Following complete addition, stirring is continued for 10 minutes while maintaining the same pH.

Subsequently, 1.38 g of a 38.5% strength sodium silicate solution, dissolved in 10 ml of deionized water, are added to the suspension over a period of two hours, using 5% strength sulfuric acid to maintain the pH at between 6.5 and 7.0. Following complete addition, stirring is continued for 10 minutes while maintaining the same pH. Thereafter, the entire pigment is sedimented and resuspended.

Subsequently, 1 g of the respective hydrophobic coupling agent is added over a period of one hour at a pH of 6.5 to 7.0, the pH being kept constant with above-mentioned sulfuric acid. Following complete addition, stirring is continued for 30 minutes. Thereafter, the reactor is filled with deionized water. The pigment is sedimented, the supernatant is decanted except for a few cm above the pigment bed, after which the pigment is resuspended in the original volume of deionized water and the suspension is stirred at a pH of from 6.5 to 7.0 for 5 minutes.

The pigment is subsequently isolated by filtration, washed carefully with 500 ml of deionized water, filtered by means of an airflow filter press, and dried overnight in an oven at 150° C.

In order to obtain different particle sizes, it is possible to separate different fractions by means of appropriate sieve apparatus.

Preparation Example (Example 7) for the Following Layer Structure

Layer 1: $SiO_2$; Layer 2: $AlO(OH)/CeO_2$; Layer 3: Hydrophobic Silane 100 g of Iriodin® 225 rutile pearl blue are suspended in 900 ml of fully deionized water and the suspension is heated to 40° C. with vigorous stirring. A pH of 9.0 is established using 2.5% strength sodium hydroxide solution (all pH values are determined with an appropriate pH indicator paper). Subsequently, a solution of 2.7 ml of sodium silicate (370 g of $SiO_2$ per liter) in 150 ml of fully deionized water is added dropwise to the pigment suspension over the course of 30 minutes. During this addition the pH is kept constant using 2.5% strength hydrochloric acid. After the end of the addition, stirring is continued at 40° C. for 15 minutes. Subsequently, the pH is adjusted to 6.5 using 2.5% strength hydrochloric acid over the course of 10 minutes. Subsequently, the pH is adjusted to 6.5 using 2.5% strength hydrochloric acid over the course of 10 minutes, after which stirring is continued again at 40° C. for 15 minutes. Then 1.35 g of sodium sulfate, 2.30 g of aluminum chloride hexahydrate and 1.10 g of cerium (III) chloride heptahydrate are added as solids to the suspension, the pH dropping to 4.0.

Subsequently, the suspension is heated to 75° C. in the course of 20 minutes and is stirred at this temperature for a further 75 minutes, the pH dropping to 3.3. Then 3.0 g of Dynasilan F 8261 (ABCR GmbH & Co. KG, Karlsruhe, Germany) pure are added over the course of 10 minutes, the pH being kept constant with above-mentioned hydrochloric acid. After the end of the addition, stirring is continued at 75° C. for 2 h, the silane being fully hydrolyzed and reacting with the pigment surface.

Subsequently, the pH is adjusted to 8.0 using 2.5% strength sodium hydroxide solution very slowly over the course of 60 minutes. The oxides, hydroxides and/or oxide hydrates are deposited and the silane is bound to the deposited oxide hydrate layer.

Subsequently, stirring is continued at 75° C. for 1 h for the purpose of afterreaction, the pH dropping to 7.0. The product is filtered off with suction over a suction filter, washed salt-free with fully deionized water, and dried at 140° C. for approximately 16 h.

Preparation Example (Example 8) for the Following Layer Structure

Layer 1: $SiO_2$; Layer 2: $ZrO_2CeO_2$; Layer 3: Hydrophobic Silane 100 g of Iriodin® 504 red are suspended in 900 ml of fully deionized water and the suspension is heated to 40° C. with vigorous stirring. A pH of 9.0 is established using 2.5% strength sodium hydroxide solution (all pH values are determined with an appropriate pH indicator paper). Subsequently, a solution of 2.7 ml of sodium silicate (370 g of $SiO_2$ per liter) in 150 ml of fully deionized water is added dropwise to the pigment suspension over the course of 30 minutes. During this addition the pH is kept constant using 2.5% strength hydrochloric acid. After the end of the addition, stirring is continued at 40° C. for 15 minutes. Subsequently, the pH is adjusted to 6.5 using 2.5% strength hydrochloric acid over the course of 10 minutes, after which stirring is continued again at 40° C. for 15 minutes. Subsequently, a solution of 1.35 g of sodium sulfate, 4.92 g of zirconium (IV) oxychloride octahydrate, 1.10 g of cerium (III) chloride heptahydrate and 2 ml of 10% strength hydrochloric acid in 100 ml of fully deionized water is added dropwise to the suspension over the course of 15 minutes, the pH dropping to 2.5.

Subsequently, the suspension is heated to 75° C. in the course of 20 minutes and is stirred at this temperature for a further 75 minutes, the pH dropping to 3.3.

Then 3.0 g of Dynasilan P 01080 (trimethoxybutylsilane from ABCR GmbH & Co. KG, Karlsruhe, Germany) pure are added over the course of 10 minutes, the pH being kept constant with above-mentioned hydrochloric acid. After the end of the addition, stirring is continued at 75° C. for 2 h, the silane being fully hydrolyzed and reacting with the pigment surface.

Subsequently, the pH is adjusted to 8.0 using 2.5% strength sodium hydroxide solution very slowly over the course of 60 minutes. The oxides, hydroxides and/or oxide hydrates are deposited and the silane is bound to the deposited oxide hydrate layer.

Subsequently, stirring is continued at 75° C. for 1 h for the purpose of afterreaction, the pH dropping to 7.0. The product is filtered off with suction over a suction filter, washed salt-free with fully deionized water, and dried at 140° C. for approximately 16 h.

The preceding examples can be repeated with similar success by substituting the generically or specifically described reactants and/or operating conditions of this invention for those used in the preceding examples.

From the foregoing description, one skilled in the art can easily ascertain the essential characteristics of this invention and, without departing from the spirit and scope thereof, can make various changes and modifications of the invention to adapt it to various usages and conditions.

What is claimed is:

1. A pearl luster pigment comprising:
    a platelet-shaped substrate coated with at least metal oxide, and a top layer located on the metal oxide layer, wherein the top layer comprises:
        a first layer, comprising a hydroxide or an oxide hydrate of aluminum or silicon;
        a second layer, comprising at least one hydroxide or oxide hydrate of aluminum, silicon, cerium or zirconium, with the exception of the hydroxide or oxide hydrate of the first layer; and
    a third layer, comprising at least one organic hydrophobic coupling agent.

2. A pearl luster pigment according to claim 1, wherein the coupling reagent is a silane and has at least one functional group of a straight-chain or a branched alkyl group having 3 to 18 carbon atoms, unsubstituted or substituted by fluorine, and an aryl group, unsubstituted or substituted by fluorine, and an aryl group, unsubstituted or substituted by $C_1$–$C_{10}$ alkyl group and/or a nitro group.

3. A process for preparing a pearl luster pigment according to claim 1, comprising:
    suspending the substrate coated with a metal oxide in water, heated at 30–100° C.,
    adjusting the suspension to a pH of 3–9,
    adding at least water-soluble metal salt,
    depositing these salts in whole or in part as a metal hydroxide and/or a metal oxide hydrate by adding at least one water-soluble silicate, aluminum salt, cerium salt and/or zirconium salt at a pH of 3–9, depositing corresponding hydroxide or oxide hydrate thereof; and adding at least one organic hydrophobic coupling agent that binds to the deposited oxide hydrate layer at a pH of 3–9.

4. A process according to claim 3, further comprising separating by sedimentation, washing, filtering, drying at 80–160° C. the pigment after adding at least one organic hydrophobic coupling agent.

5. A process according to claim 3, wherein the metal hydroxide and/or metal oxide hydrate is a hydroxide and/or oxide hydrate of aluminum or silicon.

6. A process according to claim 3, wherein the coupling reagent is a silane and has at least one functional group of a straight-chain or a branched alkyl group having 3 to 18 carbon atoms, unsubstituted or substituted by fluorine, and an aryl group, unsubstituted or substituted by $C_1$–$C_{10}$ alkyl group and/or a nitro group.

7. A method of pigmenting a paint, an ink, a plastic, a coating or a cosmetic by incorporating a pearl luster pigment according to claim 1 therein.

8. A paint, an ink, a plastic, a coating or a cosmetic pigmented with a pearl luster pigment according to claim 1.

9. A process according to claim 3, wherein suspending the substrate coated with a metal oxide in water is heated at 40–75° C. and adjusted to a pH of 6–7.

10. A process according to claim 3, wherein depositing these salts is at a pH of 6–7.

11. A process according to claim 3, wherein the adding of at least one organic hydrophobic coupling agent is at a pH of 6–8.

12. A process according to claim 4, wherein the drying is at 120–160° C.

* * * * *